Figure 1:
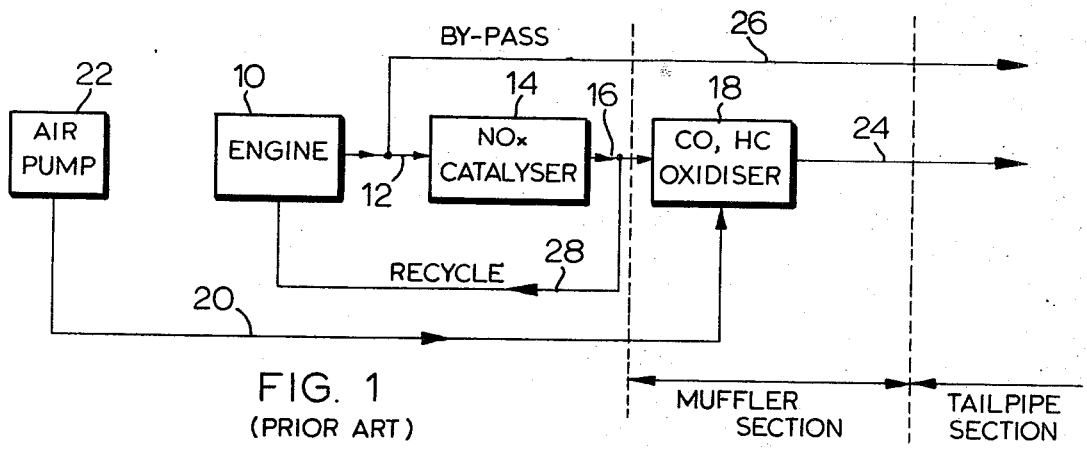

3,826,810
EMISSION CONTROL SYSTEM
Alexander Lawson, Mississauga, Ontario, Canada, assignor to Ontario Research Foundation, Sheridan Park, Ontario, Canada
Filed May 8, 1972, Ser. No. 251,457
Claims priority, application Great Britain, Sept. 21, 1971, 44,043/71
Int. Cl. B01d 53/34
U.S. Cl. 423—212        24 Claims

ABSTRACT OF THE DISCLOSURE $NO_x$ levels in gas streams, especially automotive vehicle internal combustion engine exhausts, are reduced by contacting the gas stream with a catalyst in the presence of moisture and oxygen at a temperature below 200° C.

---

This invention relates to emissions control systems more particularly to a novel process which has particular utility in reducing the emission of nitrogen oxides in exhaust gases from internal combustion engine power plants, which may be gasoline-fuelled or diesel-fuelled.

Mixtures of nitric oxide (NO) and nitrogen dioxide ($NO_2$) are present in automotive vehicle exhaust gases and represent a health hazard. Such mixtures are commonly abbreviated as $NO_x$ and this designation will be employed throughout the specification and claims. $NO_x$ in automotive vehicle exhaust streams plays a major role in the formation of photochemical smog, lacrimators and irritants in the atmosphere. Further, the presence of $NO_x$ in the atmosphere contributes to various respiratory ailments. Due to these environmental factors, control of the nitrogen oxides emitted from vehicular exhausts is becoming increasingly necessary.

Legislation for the control of $NO_x$ in the United States of America has proposed a standard for 1976 vehicles of 0.4 g. $NO_x$ per vehicle mile. The standard appears in U.S. Federal Register, volume 36, No. 128, page 12658, July 2, 1971. At the present time the average $NO_x$ emission for an uncontrolled internal combustion engine of average capacity (around 350 cu. in.) is about 4 g. per vehicle mile. Such a quantity of $NO_x$ corresponds to about 1000 to 2000 p.p.m. $NO_x$.

A number of prior art proposals have been made for reducing $NO_x$ emissions from exhaust gases, particularly from gasoline-fuelled internal combustion engines, but generally such proposals have been found to be unsatisfactory for various reasons. For example, many automobile and oil companies are directing their efforts to the catalytic reduction of $NO_x$ to nitrogen in gasoline-fuelled internal combustion engine exhausts utilizing carbon monoxide (CO). However, such reduction processes require CO concentrations in excess of the oxygen ($O_2$) present, since CO is more rapidly oxidized by $O_2$ than by $NO_x$. In order to provide the required excess of carbon monoxide in the exhaust gas stream, the gasoline-fuelled internal combustion engine must be operated with a rich gasoline-air mixture. The use of rich mixtures involves the increased formation of unconverted CO and uncombusted hydrocarbons and it is necessary to oxidise these materials after the $NO_x$ reduction and prior to exhaust of the gases to the atmosphere. Often the temperature of the exhaust gases after the $NO_x$ reduction is insufficient to sustain an efficient oxidation of CO and hydrocarbons, so that the latter materials are exhausted to the atmosphere.

Further, in this approach, the catalyst bed is located close to the engine manifold and at high speeds of operation the temperature of the exhaust gases may be such as to cause deterioration of the catalyst, and hence a bypass, operable at such high speeds, must be provided to protect the catalyst bed from deterioration by high exhaust gas temperatures. During those periods when the bypass is in operation, since the $NO_x$ does not contact its conversion catalyst obviously there is no control of the $NO_x$ emissions.

A further drawback to this proposed system is that upon cold starting of the engine, the exhaust gases do not have a temperature sufficient to provide efficient catalytic reduction of $NO_x$ and hence the $NO_x$ emissions would be high until the exhaust gases achieved their normal temperature.

Additionally, by having to utilize rich gasoline-air mixtures as feed to the engine, considerable quantities of fuel are not combusted efficiently, but pass as uncombusted hydrocarbons into the exhaust stream. Therefore, there is a considerable fuel wastage with consequent increased operating cost.

In diesel-fuelled internal combustion engines, the above prior art proposal would be completely ineffective. In the diesel engine the exhaust gases contain low levels of CO and high concentrations of $O_2$ generally in considerable excess of the carbon monoxide present. If it were attempted to reduce the $NO_x$ by the CO present in the diesel engine exhaust gas, there would be a preferential oxidation of the CO by the oxygen and the $NO_x$ gases would be exhausted substantially unconverted.

In accordance with the present invention, a novel process is utilized to reduce $NO_x$ emissions in exhaust gases. In the present invention, a gas stream containing the $NO_x$ is contacted with a catalyst in the presence of oxygen and moisture at a low temperature to convert at least part of the $NO_x$ to nitrogen and oxygen. As will become more apparent hereinafter, the process of the invention has considerable advantages over the prior art proposals discussed above and represents a practical system for the reduction of $NO_x$ emissions from both gasoline-fuelled and diesel-fuelled internal combustion engine exhaust gas streams.

It is known that dry $NO_2$ can be decomposed in oxygen at high temperatures of around 200 to 500° C. on inorganic catalysts to form nitrogen. However, in the presence of moisture the reaction does not proceed to form nitrogen.

In view of these observations it is surprising that $NO_x$ levels in a gas stream may be reduced readily at considerably lower temperatures, generally below about 150° C., in the presence of moisture, oxygen and a catalyst.

The mechanism whereby the $NO_x$ levels are reduced in accordance with the present invention is not fully understood and any theory to explain the process therefore would be speculative.

While temperatures above 150° C. up to about 200° C. may be utilized, if desired, generally such higher temperatures are avoided since the rate of conversion of $NO_x$ to nitrogen and oxygen is considerably lower than below 150° C. Additionally, many of the catalyst systems discussed below are not stable at the higher temperatures. The process of the invention may be carried out at ambient temperatures, typically around 25° C. and temperatures below 100° C. are preferred. The particular temperature chosen for optimum rate of conversion depends on a number of factors, such as, the catalyst system employed, the nature of the gas stream being treated, and the quantity of oxygen and moisture present.

A number of catalysts for the conversion of $NO_x$ to nitrogen and oxygen may be employed in the process of the invention. The catalysts may be divided into two classes, inorganic and organic. The inorganic catalysts typically are noble and precious metals and their oxides, such as silver, platinum, ruthenium, rhodium and silver oxide. Certain other metallic oxide catalysts, such as, alumina, may be employed. The organic catalysts have been found to be particularly effective and they are preferred, due to their ready availability and cheapness.

The organic catalysts preferably utilized in the process of the invention are derivatives of carbonic acid

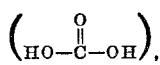, thiocarbonic acid

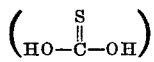

and sulfonic acid ($HO-SO_2-OH$) containing at least one primary amino ($-NH_2$) group.

The catalysts may be represented by the formula: $R-X-NH_2$ where R is an alkyl, alicyclic, heterocyclic, hydroxy, alkoxy, amino, or mono or disubstituted amino group, and X is a carbonyl, sulfonyl, thionyl or imino group.

The organic catalysts utilizable in the process of the invention may be simple amides in which R is an alkyl or alicyclic group and X is a carbonyl group.

Another class of organic compounds which may be employed include alkyl sulfonamides in which R is an alkyl group and X is a sulfonyl group. An example of a sulfonamide which may be utilized is ethanesulfonamide.

Also utilizable are organic compounds in which the R group is hydroxyl and the X group is carbonyl or thionyl and such materials are carbamic acid and thiocarbamic acid. R also may be an alkoxy group when the X is carbonyl or sulfonyl, providing carbamates and thiocarbamates. An example of a typical carbamate utilizable in the process of the invention is ethyl carbamate.

The R group may be an amino group when the X group is carbonyl or thionyl and hence the organic catalyst may be urea or thiourea. It has been found that urea is a particularly effective catalyst and has the distinct advantage that it is cheap and readily available.

When the X group is imino, the R group is amino, then the compound is guanidine which may be utilized in the process of the invention. The R group also may be a mono- or di-substituted amino group when X is an imino group. For example, the amino group may be substituted by a cyano group, and hence the catalyst may be dicyandiamide.

Where the amino group is disubstituted, an example of such a material is melamine and the presence of such disubstitution is shown by the following structural formula:

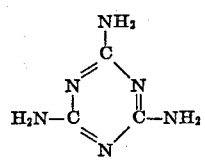

The catalyst usually is supported, although an unsupported catalyst may be employed, if desired. A number of catalyst supports are known, and some of these may have mild catalytic activity in the process of the invention. The catalyst supports utilized may be carbon based, or may be an inorganic oxide, such as silica and alumina, or a silicate, for example, a clay. Combinations of the catalysts with the supports provide novel catalyst systems. Since the reaction is carried out at a comparatively low temperature, there are no carrier stability problems encountered.

The loading of the catalyst on the support may vary over a wide range, typically from 1 to 50% by weight of the support, and the optimum value varies depending on the catalyst system employed.

As indicated above, the process of the present invention requires the presence of molecular oxygen and moisture. Also, where the nitrogen oxide is only nitrogen dioxide, oxygen may be omitted and $NO_2$ may be converted to nitrogen and oxygen in the presence of moisture only. The present invention includes this modification.

The quantity of moisture present in the gas stream may vary from as low as 0.1% to saturation. Usually about 1 to 10% moisture is present in the gas stream.

The oxygen content also may vary over a wide range. Oxygen may form the carrier gas for the $NO_x$ in which case the percentage oxygen would be very high. Also, air may form the carrier gas, in which case the quantity of oxygen present would be approximately 20%. Quantities as low as about 1% may be employed, although the rate of reaction is slow and hence such low quantities generally are avoided. When about 5% of oxygen is present a rapid reaction rate may be measured.

The process of the present invention has particular applicability in the control of $NO_x$ emissions from internal combustion engines. Motor vehicle exhausts generally are saturated with water vapor formed in the combustion process and hence when $NO_x$ levels are reduced using the process of the present invention it is not necessary to utilize moisture external to the system for the process to operate.

The oxygen required in the process of the invention may be provided through carburation or external to the system by pumping air into the exhaust gases upstream of the catalyst.

The present invention will be described hereinafter in relation to the reduction of $NO_x$ levels in automotive vehicle exhaust systems, but it will be understood that the present invention is applicable to the reduction of $NO_x$ concentrations in other gas streams.

Figure 2:
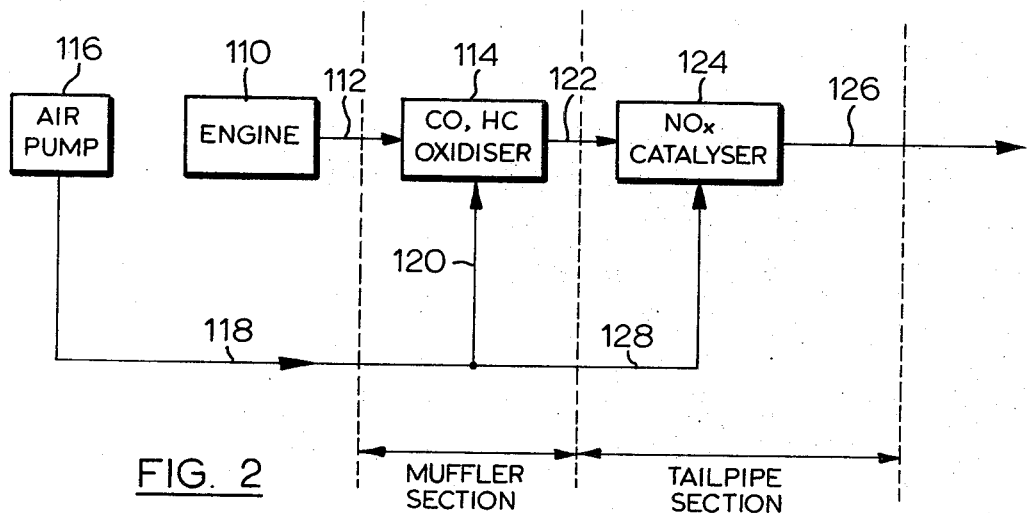

The invention is further described below, by way of illustration, with reference to the accompanying drawings, in which FIG. 1 represents a proposed prior art system; and
FIG. 2 represents one embodiment of the invention.

As shown in FIG. 1, a prior art system involves a gasoline-fuelled internal combustion engine 10 which produces an exhaust gas containing $NO_x$ and rich in CO which is exhausted from the engine through an exhaust manifold into an exhaust line. A gas stream rich in CO and low in $O_2$ is formed by operating the engine 10 with a rich gasoline-air mixture. The exhaust gas from the engine 10 is passed by line 12 to a $NO_x$ catalyser 14. The catalyser 14 is positioned close to the exhaust manifold of the engine 10 and reduction of $NO_x$ in the exhaust gas line 12 takes place by the action of the CO. The product gas stream from the catalyser 14 is fed by line 16 to a carbon monoxide and hydrocarbon oxidiser 18 in the muffler section of the exhaust line. Air is fed to the oxidiser by line 20 from air pump 22 driven by the engine 10 to provide the oxygen for oxidation of the CO and hydrocarbons. The treated exhaust gas then passes by line 24 to the tail pipe section and thence to the atmosphere.

Due to the proximity of the $NO_x$ catalyser 14 to the engine manifold under highway cruise conditions the exhaust gases in line 12 become so hot that thermal degradation of the catalyst may occur. Hence, under these conditions it is necessary to provide a bypass line 26 by which the exhaust gases, containing $NO_x$ and rich in CO and uncombusted hydrocarbons, pass to the atmosphere untreated, and under these conditions the desired reduction in harmful exhaust emissions is not achieved.

Further, a recycle line 28 is provided to recycle the product gases from the catalyser 14 to the engine 10, in an attempt to reduce $NO_x$ concentrations omitted by the engine 10 and to utilize uncombusted hydrocarbons in the engine 10.

The above illustrated prior art system suffers several drawbacks, as discussed earlier. Thus, under high speed operating conditions, there is no removal of $NO_x$; upon cold starting the exhaust gases do not achieve a high enough temperature to provide an efficient reduction reaction between the $NO_x$ and CO in the catalyser 14 or an efficient oxidation of unconverted CO and uncombusted hydrocarbons in oxidiser 114; and the system cannot be employed with a diesel engine because of inadequate CO levels in these exhaust gases.

Turning now to FIG. 2, there is illustrated a novel exhaust system embodying this invention. An engine 110 produces an exhaust gas stream which leaves the engine through an exhaust manifold and is passed to line 112 which is part of an exhaust system. The engine 110 may be a gasoline-fuelled or diesel-fuelled internal combustion engine since the process of the invention does not rely on excess CO to reduce $NO_x$. Where the engine is gasoline-fuelled, it may be operated with a lean gasoline-air mixture so that there is a low CO and unconverted hydrocarbon content in the exhaust gases 112. The use of the lean mixture reduces the quantity of CO and unconverted hydrocarbons to be later treated and increases the quantity of oxygen in the exhaust gas stream, so as to provide at least part of the desired quantity of oxygen. In many cases it may be unnecessary to add any further oxygen to the stream. An engine running on a lean mixture makes more efficient use of the fuel available and hence reduces operating cost. Also, since the exhaust gas stream in line 112 is saturated with water vapor it is not necessary to add additional quantities of moisture to the exhaust gas stream.

Diesel-fuelled engines operate in an excess of air, providing low CO and uncombusted hydrocarbon contents in the exhaust gases, and hence providing at least part of the oxygen requirement of the process. The exhaust gas stream contains water vapor from the combustion of the hydrocarbons and generally again it is not necessary to add additional quantities of moisture to the exhaust gas stream.

The exhaust gases pass through line 112 to an oxidiser 114 wherein the carbon monoxide and uncombusted hydrocarbons in the exhaust gases are oxidised. The exhaust gas stream 112 may contan insufficient oxygen to achieve the oxidation and excess oxygen may be pumped from an air pump 116 driven by the engine 110 by lines 118 and 120. As in the case of the prior art system of FIG. 1, the CO and hydrocarbon oxidiser is located in the muffler section of the exhaust system. The exhaust gases in this region of the exhaust system typically have a temperature of about 500° C.

In contrast to the prior art system where cooling of the exhaust gases in the $NO_x$ catalyser 14 may lead to inefficient operation of the CO oxidiser 18, in the system of the present invention, the exhaust gases are not subjected to any preliminary reaction before the oxidiser 114 and hence the exhaust gases have only undergone their natural degree of cooling as they reach the muffler section.

The gases from the oxidiser 114, containing water vapor and $NO_x$ is fed by line 122 to an $NO_x$ catalyser 124 located in the tailpipe section of the exhaust system. The catalyser 124 is constructed so that the gases in line 122 contact a bed of catalyst supported therein.

In the tailpipe section exhaust gases can have a temperature of around 100° C. or below. At this temperature, at least some of the $NO_x$ reacts, in accordance with the novel process of this invention, with the water vapor and oxygen in the presence of a suitable catalyst system, such as urea on a charcoal carrier, to form nitrogen.

The exhaust gas having a reduced $NO_x$ content is passed by line 126 from the catalyser 124 to atmosphere. Air may be pumped to the catalyser 124 by line 128 from the pump 116 to mix with the gases fed by line 122 to provide the necessary oxygen for the reaction to nitrogen if there is insufficient oxygen in the stream in line 122.

In contrast to the prior art system described above with reference to FIG. 1, the efficiency of the system is not impaired by either high temperatures of the exhaust gases in line 112 due to high speed operation of the vehicle, or cold start operation. In the former case, the $NO_x$ catalyser 124 is located in the tailpipe section of the exhaust line and hence there is no danger of the catalyst degradation present in the prior system of FIG. 1. In the latter case, the process of conversion of $NO_x$ in the presence of steam and oxygen proceeds efficiently over a wide range of temperatures up to about 150° C.

A further advantage of the system of the present invention as depicted in FIG. 2 is that it may be employed with diesel-fuelled internal combustion engines since the conversion of $NO_x$ to $N_2$ is not dependent in the present case on CO, in complete contrast to the prior art system of FIG. 1. The system outlined above with reference to FIG. 2 represents the only known manner of efficiently reducing $NO_x$ emissions from diesel engines.

It will be seen therefore that the present invention provides an efficient manner of reducing $NO_x$ levels in internal combustion engine gas streams, with many advantages not realized in prior art proposals.

The invention is further described with reference to the following examples:

EXAMPLE 1

A gas stream containing 2400 p.p.m. NO in the presence of 20% $O_2$ and saturated with water vapor was passed into contact with a bed of catalyst at 25° C. The catalyst was a silver metal-silver oxide mixture supported on an alumina carrier. Gas flow rates and catalyst bed size were such that the contact time of the stream with the bed was about 1.5 secs. and measurement of the NO contact of the stream after contact with the bed revealed a 900 p.p.m. NO content.

EXAMPLE 2

An exhaust gas stream from a non-automotive gasoline-fuelled internal combustion engine containing 360 p.p.m. $NO_x$ was passed into contact with an urea on charcoal catalyst. The contact time was about 1 sec. The $NO_x$ content was reduced to about 150 p.p.m.

EXAMPLE 3

An exhaust gas stream from a 350 cu. in. automobile engine equipped with auxiliary air injection apparatus was passed into contact with an urea on charcoal catalyst at 60° C. The contact time was about 1 second and it was found that the $NO_x$ content of the stream was reduced from about 880 to about 440 p.p.m.

EXAMPLES 4 to 14

A plurality of gas streams were passed into contact with a number of catalyst systems at 60° C. The $NO_x$ concentrations of the streams were measured both before and after contact with the catalyst bed. The results appear below in Table I:

TABLE I

| Example number | Catalyst | Inlet gas composition | $NO_x$ in (p.p.m.) | $NO_x$ out (p.p.m.) | Flow rate, ml./min.$^{-1}$ | Catalyst weight, g. |
|---|---|---|---|---|---|---|
| 4 | 15% urea on charcoal | $NO_2$/Argon (A) | 1,900 | 160 | 880 | 11.0 |
| 5 | do | NO/Air | 1,850 | 540 | 920 | 13.3 |
| 6 | do | NO/50% $O_2$/A | 2,000 | 300 | 920 | 10.8 |
| 7 | 17% melamine on charcoal | $NO_2$/A | 316 | 5 | 720 | 13.2 |
| 8 | 16.6% Ethane sulfonamide on charcoal | $NO_2$/A | 316 | 133 | 720 | 11.5 |
| 9 | 26.2% Ethyl carbamate on charcoal | $NO_2$/A | 316 | 108 | 720 | 14.7 |
| 10 | 25% Guanidine on charcoal | $NO_2$/A | 316 | 5 | 720 | 13.4 |
| 11 | 8% urea on alumina | $NO_2$/A | 316 | 10 | 720 | 11.4 |
| 12 | 16.6% thiourea on charcoal | $NO_2$/A | 316 | 17 | 917 | 13.2 |
| 13 | 16.6% dicyandiamide on charcoal | $NO_2$/A | 316 | 17 | 917 | 13.3 |
| 14 | 16.6% ethane sulphonamide/charcoal | N/16% $O_2$/A | 1,465 | 890 | 859 | 11.8 |

EXAMPLE 15

An exhaust gas stream from gasoline-fuelled internal combustion engine having an $NO_x$ content of approximately 700 p.p.m. was passed into contact with a bed of catalyst consisting of 10 gms. or 12.3% urea on charcoal at 60° C. at a flow rate of 800 ml./min. with a contact time of about 1 second. The $NO_x$ content of the stream after contact with the catalyst bed was found to be about 175 p.p.m.

The stream was continued to be passed into contact with the bed of catalyst over a period of about 20 hours and the quantity of $NO_x$ in the inlet and outlet to the catalyst bed was measured at certain time intervals. The results appear in Table II below:

TABLE II

| Time (hrs.) | $NO_x$ in (p.p.m.) | $NO_x$ out (p.p.m.) |
|---|---|---|
| 0 | 700 | 175 |
| ½ | 700 | 200 |
| 1 | 700 | 250 |
| 2 | 700 | 300 |
| 2½ | 700 | 300 |
| 3 | 700 | 300 |
| 4½ | 700 | 300 |
| 6 | 650 | 300 |
| 9 | 500 | 200 |
| 13 | 600 | 200 |
| 19 | 600 | 200 |

It will be seen from this table that the catalyst system is effective in removing $NO_x$ from the exhaust gas stream over an extended period of time.

EXAMPLE 16

Exhaust gas from a 350 cubic inch automobile engine equipped with air injection was passed into contact with a melamine-charcoal catalyst at 60° C. The contact time was 1 sec. The $NO_x$ content was reduced from 920 p.p.m. to 530 p.p.m.

Modifications are possible within the scope of the invention.

What I claim is:

1. A process for decreasing the concentration of $NO_x$ in a gas stream containing $NO_x$, water vapor and oxygen, said gas stream being substantially free from reducing gases, which comprises contacting the gas stream with solid urea at a temperature below about 200° C., and catalytically converting at least part of the $NO_x$ content to gaseous nitrogen.

2. The process of claim 1 wherein said temperature is from ambient to about 150° C.

3. The process of claim 1 wherein said temperature is from ambient to about 100° C.

4. The process of claim 1 wherein said temperature is from about 60° C. to about 100° C.

5. The process of claim 1 wherein said solid urea includes a support material.

6. The process of claim 5 wherein said support material is carbon based.

7. The process of claim 5 wherein said support material is an inorganic oxide.

8. The process of claim 7 wherein said inorganic oxide is alumina.

9. The process of claim 1 wherein said solid urea is supported on charcoal.

10. The process of claim 1 wherein said solid urea is supported on alumina.

11. The process of claim 1 wherein the quantity of water vapor in said stream varies from 0.1% to saturation of the volume of the gas stream.

12. The process of claim 11 wherein the quantity of water vapor is from about 1 to 10% of the volume of the gas stream.

13. The process of claim 1 wherein the quantity of oxygen present is at least about 1% of the volume of the gas stream.

14. The process of claim 1 wherein the gas stream is substantially pure oxygen containing said $NO_x$ and water vapor.

15. The process of claim 1 wherein the gas stream is substantially air containing said $NO_x$ and water vapor.

16. The process of claim 1 wherein the quantity of oxygen is about 5% of the volume of said gas stream.

17. The process of claim 1 wherein the quantity of water vapor is from about 1 to 10% and the quantity of oxygen is about 5% of the volume of said gas stream.

18. The process of claim 1 wherein said gas stream is an exhaust gas stream from a gasoline-fuelled internal combustion engine.

19. The process of claim 1 wherein said gas stream is an exhaust gas stream from a diesel-fuelled internal combustion engine.

20. The process of claim 8 wherein said exhaust gas stream is contacted with a bed of said solid urea at a temperature from ambient to about 150° C.

21. The process of claim 20 wherein said urea is supported on charcoal in said bed.

22. The process of claim 19 wherein said exhaust gas stream is contacted with a bed of said solid urea at a temperature from ambient to about 150° C.

23. The process of claim 22 wherein said urea is supported on charcoal in said bed.

24. A process for decreasing the concentration of $NO_2$ in a gas stream containing $NO_2$ and moisture, said gas stream being substantially free from molecular oxygen and reducing gases, which comprises contacting the gas stream with solid urea at a temperature below about 200° C., and catalytically converting at least part of the $NO_2$ to gaseous nitrogen.

References Cited

UNITED STATES PATENTS

| | | | |
|---|---|---|---|
| 2,992,895 | 7/1961 | Feustel et al. | 423—239 |
| 3,044,844 | 7/1962 | Maury et al. | 423—235 |
| 3,491,031 | 1/1970 | Stoneburner | 252—428 |
| 3,584,994 | 6/1971 | Herbsman | 423—212 |
| 3,599,427 | 8/1971 | Jones | 423—212 X |
| 3,674,423 | 7/1972 | Klimisch | 423—213 |

FOREIGN PATENTS

| | | | |
|---|---|---|---|
| 1,135,428 | 8/1962 | Germany | 423—239 |
| 186,985 | 11/1966 | U.S.S.R. | 423—239 |

GEORGE O. PETERS, Primary Examiner

U.S. Cl. X.R.

60—301; 423—239